(12) United States Patent
Majima et al.

(10) Patent No.: US 6,324,660 B1
(45) Date of Patent: Nov. 27, 2001

(54) DEFECT MANAGEMENT METHOD FOR A MAGNETIC RECORDING MEDIUM

(75) Inventors: Yoshihide Majima, Hadano; Yoshinori Tangi, Hachiouji; Eiichi Yoneyama; Toshimitsu Itoh, both of Atsugi, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/299,432

(22) Filed: Apr. 26, 1999

(30) Foreign Application Priority Data

Apr. 27, 1998 (JP) .................................................. 10-117219

(51) Int. Cl.$^7$ .................................................. G11C 29/00
(52) U.S. Cl. ........................................... 714/710; 714/723
(58) Field of Search ..................................... 714/710, 723, 714/770, 745, 763, 769; 711/111, 159, 202, 206

(56) References Cited

U.S. PATENT DOCUMENTS

| | | | |
|---|---|---|---|
| 5,701,304 | * 12/1997 | Glover et al. | 714/710 |
| 5,751,733 | * 5/1998 | Glover | 714/765 |
| 5,844,914 | * 12/1998 | Kim et al. | 714/718 |
| 5,872,800 | * 2/1999 | Glover et al. | 714/766 |

FOREIGN PATENT DOCUMENTS 6-251503    9/1994   (JP) .

* cited by examiner

Primary Examiner—Christine T. Tu
(74) Attorney, Agent, or Firm—Frishauf, Holtz, Goodman, Langer & Chick, P.C.

(57) ABSTRACT

In a method of carrying out defect management on reading data from a disk-shaped magnetic recording medium comprising a plurality of tracks separated into a user data area available to a user, an alternate area, and a management area, the method comprises the steps of retrying reading operation of data up to a maximum retry count when an error is detected on reading of data for a target sector in the user data area and of registering the target sector in a defect table in the management area and writing read-out data in an alternate sector in the alternate area in a case where a retry count is not less than a specific count when retry results in a success. Alternatively, the method comprises the steps of retrying reading operation of data up to a maximum retry count when an error is detected on reading of data for a target sector in the user data area, of overwriting read-out data in the target sector in a case where a retry count is not less than a specific count when retry results in a success, and of registering the target sector in a defect table in the management area and writing read-out data in an alternate sector in the alternate area in a case where an error is detected when overwritten data is reread from the target sector.

12 Claims, 8 Drawing Sheets

DEFECT MANAGEMENT METHOD FOR A MAGNETIC RECORDING MEDIUM

BACKGROUND OF THE INVENTION

This invention relates to a defect management method on occurrence of an error when data are read out of a magnetic recording medium such as a flexible or floppy disk (which may be abbreviated to "FD") or a hard disk (which may be abbreviated to "HD") that is accessed by a magnetic recording and reproducing device such as a flexible or floppy disk drive (which may be abbreviated to "FDD") or a hard disk drive (which may be abbreviated to "HDD").

Although description will be made a case where the magnetic recording and reproducing device is the flexible disk drive and the magnetic recording medium is the flexible disk, of course, application is not restricted to this case.

As is well known in the art, the flexible disk drive of the type described is a device for carrying out data recording and reproducing operation to and from a magnetic disk medium of the flexible disk loaded therein. In recent years, the flexible disks are more and more improved to have a larger storage capacity. Specifically, development is made of the flexible disks having the storage capacity of 128 Mbytes (which may be called large-capacity FDs) in contrast with the flexible disks having storage capacity of 1 Mbytes or 2 Mbytes (which may be called small-capacity FDs). Following such development, the flexible disk drives have also improved to accept the large-capacity FDs for data recording and reproducing operations to and from the magnetic recording media of the large-capacity FDs. Furthermore, the large-capacity FDs are more improved to have a larger storage capacity of 256 Mbytes, 512 Mbytes, . . . , and so on.

Throughout the present specification, flexible disk drives capable of recording and reproducing data for magnetic recording media of the large-capacity FDs alone will be referred to as high-density exclusive type FDDs. On the other hand, flexible disk drives capable of recording and reproducing data for magnetic recording media of the small-capacity FDs alone will be called low-density exclusive type FDDs. Furthermore, flexible disk drives capable of recording and reproducing data for magnetic recording media of both the large-capacity and the small-capacity FDs will be called high-density and low-density compatible type FDDs. In addition, the high-density exclusive type FDDs and the high-density and low-density compatible type FDDs will collectively be called high-density type FDDs.

The low-density exclusive type FDD and the high-density type FDD are different in mechanism from each other in several respects, one of which will presently be described. In either FDD, a pair of magnetic heads is supported by a carriage which is driven by a drive arrangement to move in a predetermined radial direction with respect to the magnetic disk medium of the flexible disk loaded in the flexible disk drive. The difference resides in the structure of the structure of the drive arrangement. More specifically, the low-density exclusive type FDD uses a stepping motor as the drive arrangement. On the other hand, the high-density type FDD uses a linear motor such as a voice coil motor (which may be abbreviated to "VCM") as the drive arrangement.

Now, description will be made in slightly detail as regards the voice coil motor used as the drive arrangement in the high-density type FDD. The voice coil motor comprises a voice coil and a magnetic circuit. The voice coil is disposed on the carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that the magnetic field generated by the magnetic circuit, a drive force occurs in a direction extending to the axis on the basis of interaction of the electric current with the magnetic field. The drive force causes the voice coil motor to move the carriage in the predetermined radial direction.

Another difference between the low-density exclusive type FDD and the high-density type FDD resides in the number of revolution of a spindle motor for rotating the magnetic disk medium of the flexible disk loaded therein. More specifically, the low-density exclusive type FDD may rotate the magnetic disk medium of the small-capacity FD loaded therein at a low rotation speed having the number of revolution of either 300 rpm or 360 rpm. On the other hand, the high-density type FDD can admit, as the flexible disk to be loaded thereinto, either the large-capacity FD alone or both of the large-capacity FD and the small-capacity FD. As a result, when the large-capacity FD is loaded in the high-density type FDD, the spindle motor for the high-density type FDD must rotate the magnetic disk medium of the large-capacity FD loaded therein at a high rotation speed having the number of revolution of 3,600 rpm which is equal to ten or twelve times as large as that of the small-capacity FD.

In the meanwhile, the large-capacity FD generally has an external configuration identical with that of the small-capacity FD. Specifically, both of the large-capacity and the small-capacity FDs have a flat rectangular shape of a width of 90 mm, a length of 94 mm, and a thickness of 3.3 mm in case of a 3.5-inch type. However, the large-capacity FD has a narrower track width (track pitch) than that of the small-capacity FD. As a result, it is difficult for the large-capacity FD to position a magnetic head of the high-density type FDD on a desired track in the magnetic recording medium thereof in contrast with the small-capacity FD. Accordingly, a servo signal for position detection is preliminarily written in the magnetic disk medium of the large-capacity FD.

In the meanwhile, the flexible disk about to manufactured (which will be called a raw flexible disk) comprises merely a magnetic disk medium having both surface coated by the magnetic material. In order to enable to make the raw flexible disk utilize for an electronic device such as a personal computer or a word processor, it is necessary for the row flexible disk to partition the magnetic disk medium into a plurality of regions with respective addresses and to record and manage what information should be written in each region. Such a sequence of processing steps is called a format(ting) or an initialization.

In general, the flexible disk comprises the magnetic disk medium on which a plurality of tracks are arranged with concentric circles around a center of rotation thereof. Each track is divided in a circumferential direction into a predetermined number of sectors having a length equal to one another.

The formatting is classified into a physical formatting and a logical formatting. The physical formatting determines how data is arranged on the magnetic disk medium. Specifically, the physical formatting determines the total tracks, the total usable tracks, the number of sectors in each track, a medium storage capacity, a format storage capacity, and so on. On the other hand, the logical formatting determines locations where information corresponding to table of contents is written on the magnetic disk medium and assigns address to units each of which writes information. The logical formatting is also called a sector formatting.

In addition, the sector formatting is performed by using a servo writer and a media formatter. The servo writer partitions first each sector into a servo field and a data field to write the above-mentioned serve signal in the servo field. In this event, the sectors on each track are assigned with sector numbers in the circumferential direction in order. Thereafter, the media formatter carries out test of the sector format and preparation of a defect map. The defective map is called a defect table.

Specifically, not that all of the tracks on the magnetic disk medium can be used by a user, an area available to the user is restricted. Such an area is referred to as a user data area. Tracks other than the user date area are used as alternate tracks for replacing defective sectors in the user data area or the like. Such an area for the alternate tracks is called an alternate area. In addition, another area for storing the above-mentioned defect map and other management tables is referred to as a management area. The alternate area is generally disposed in the magnetic disk medium in the radial direction inward while the management area is disposed in the magnetic disk medium in the radial direction outward. In addition, separation of the tracks into the user data area, the alternate area, and the management area is carried out in the physical formatting.

The media formatter first performs test of the sector format to detect the detective sectors on the user data area. Subsequently, the media formatter carries out rearrangement of the sectors except for the defective sectors. Thereafter, the media formatter prepares the above-mentioned defect map or defect table. The defect map or the defect table is a table for entering information indicating where the defective sectors on the user data area are arranged to which alternate sectors in the alternate area. The defect map or the defect table is stored in a predetermined sector in the management area. If a sector-formatted flexible disk has the storage capacity which is less than a predetermined specification storage capacity due to the presence of a lot of defective sectors, the sector-formatted flexible disk is discarded because the sector-formatted flexible disk cannot be used any longer.

As described above, there are various types of the large-capacity FDs so as to have the storage capacity of 128 Mbytes or 256 Mbytes. Throughout the present specification, the large-capacity FD having the storage capacity of 128 Mbytes is called a single-density large-capacity FD while the large-capacity GD having the storage capacity of 256 Mbyte is called a double-density large-capacity FD. Although each of the single-density large-capacity FD and the double-density large-capacity FD has the same line recording density, the same sector format (serve format), and the same number of disk revolution, the single-density large-capacity FD and the double-density large-capacity FD have different track densities from each other. That is, the double-density large-capacity FD has the track density twice as large as that of the single-density large-capacity FD.

Although the above-mentioned description is made as regards processing on the formatting, such sector management or defect management may be carried out on usual read-out/write-in operation of data after the formatting comes to end.

In the manner which will later be described in conjunction with FIG. 1, in a conventional read command processing, when reading operation of data is imperfect, retry is repeated up to a maximum retry count. When data is normally read after several retries without amounting to the maximum retry count, the read command processing comes to a correct end without performing any processing.

However, it is feared that data normally read after several retries becomes to be broken down in the near future so that a sector (which is called a data sector) storing the data becomes a defective sector. Nevertheless, in the conventional read command processing comes to the correct end without performing any processing. In other words, no processing is carried out when retry results in a success.

Another read command processing is disclosed in Japanese Unexamined Patent Publication of Tokkai No. Hei 6-251,503 or JP-A 6-251,503 which has a title of "METHOD FOR CONTROLLING FLEXIBLE DISK DEVICE." According to JP-A 6-251,503, management information is stored in an information management area. In addition, when retry results in a failure, data stored in a target sector is copied in the information management area. However, in JP-A 6-251,503 also, no processing is carried out when retry results in a success in the similar manner as the above-mentioned conventional read command processing.

SUMMARY OF THE INVENTION

It is therefore an object of the present invention to provide a defect management method which is capable of carrying out protection of data stored in the data sector before the data sector progressively becomes a defective sector due to a defect or the like.

It is another object of the present invention to provide a defect management method of the type described, which is capable of reducing a retry count on reading operation of data.

It is still another object of the present invention to provide a defect management method of the type described, which is capable of shortening a date readout time.

Other objects of this invention will become clear as the description proceeds.

On describing the gist of this invention, it is possible to be understood that a method carries out defect management on reading data from a disk-shaped magnetic recording medium to be accessed. The magnetic recording medium comprises a plurality of tracks thereon which are arranged with concentric circles. Each track is divided in a circumferential direction into a predetermined number of sectors having a length equal to one another. The plurality of tracks are separated into a user data area available to a user, an alternate area, and a management area.

According to an aspect of this invention, the above-mentioned method comprises the steps of retrying reading operation of data up to a maximum retry count when an error is detected on reading of data for a target sector in the user data area and of registering the target sector in a defect table in the management area and writing read-out data in an alternate sector in the alternate area in a case where a retry count is not less than a specific count when retry results in a success.

According to another aspect of this invention, the above-mentioned method comprises the steps of retrying reading operation of data up to a maximum retry count when an error is detected on reading of data for a target sector in the user data area, of overwriting read-out data in the target sector in a case where a retry count is not less than a specific count when retry results in a success, and of registering the target sector in a defect table in the management area and writing read-out data in an alternate sector in the alternate area in a case where an error is detected when overwritten data is reread from the target sector.

On describing the gist of this invention, it is possible to be understood that a recording medium records a program to make a computer execute defect management on reading data from a disk-shaped magnetic recording medium to be accessed. The magnetic recording medium comprises a plurality of tracks thereon which are arranged with concentric circles. Each track is divided in a circumferential direction into a predetermined number of sectors having a length equal to one another. The plurality of tracks are separated into a user data area available to a user, an alternate area, and a management area.

According to an aspect of this invention, the above-mentioned recording medium records the program to make the computer execute processing of retrying reading operation of data up to a maximum retry count when an error is detected on reading of data for a target sector in the user data area, and processing of registering the target sector in a defect table in the management area and of writing read-out data in an alternate sector in the alternate area in a case where a retry count is not less than a specific count when retry results in a success.

According to another aspect of this invention, the above-mentioned recording medium records the program to make the computer execute processing of retrying reading operation of data up to a maximum retry count when an error is detected on reading of data for a target sector in the user data area, processing of overwriting read-out data in the target sector in a case where a retry count is not less than a specific count when retry results in a success, and processing of registering the target sector in a defect table in the management area and of writing read-out data in an alternate sector in the alternate area in a case where an error is detected when overwritten data is reread from the target sector.

DESCRIPTION OF THE PREFERRED EMBODIMENTS

Figure 1:
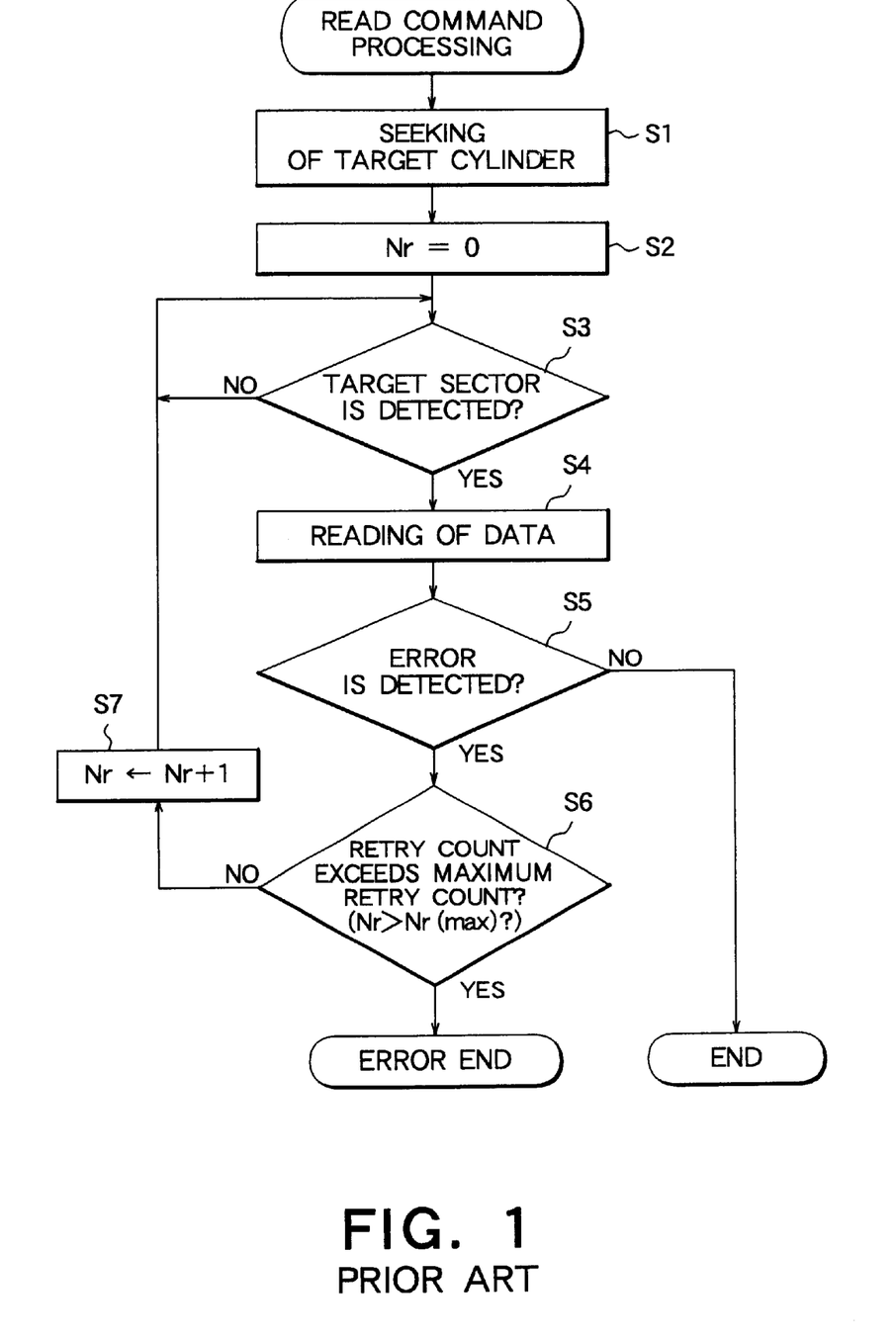
FIG. 1 is a flow chart for use in describing a conventional read command processing.

Referring to FIG. 1, a conventional read command processing on occurrence of a read command will be described at first in order to facilitate an understanding of the present invention. The flexible disk drive comprises a controller or processor (not shown) for processing the read command.

First, the controller seeks or locates a target cylinder using a magnetic head of the flexible disk drive (step S1). The step S1 is followed by a step S2 at which the controller initializes a retry count Nr to zero, namely, Nr=0. The step S2 proceeds to a step S3 at which the controller determines whether or not a target sector is detected on the target cylinder using the magnetic head. When the target sector is detected, the step S3 is succeeded by a step S4 at which the controller reads data out of the target sector using the magnetic head. The step S4 is followed by a step S5 at which the controller determines whether or not an error is detected in the read-out data. When no error is detected in the read-out data, the read command processing normally comes to a correct end.

On the other hand, when any error is detected read-out data, the step S5 proceeds to a step S6 at which the controller determines whether or not the retry count Nr exceeds a maximum retry count Nr(max) or (Nr>Nr(max)). The maximum retry count Nr(max) is, for example, equal to fifty. When the retry count Nr is not more than the maximum retry count Nr (max), namely, Nr≧Nr (max), the steps S6 is succeeded by a step S7 at which the controller increments the retry count Nr by one. The step S7 returns to the step S2 to repeat processing in the steps S3 through S6. When the retry count is more than the maximum retry count Nr(max), namely, Nr>Nr(max), the read command processing comes to an error end.

As described above, in the conventional read command processing, when reading of data is imperfect, retry is repeated up to the maximum retry count Nr(max). When data is normally read after several retries without amounting to the maximum retry count Nr(max), the read command processing comes to the correct end without performing any processing.

However, it is feared that data normally read after several retries becomes to be broken down in the near future so that the data sector storing the data becomes a defective sector. Nevertheless, the conventional read command processing comes to the correct end without performing any processing, as mentioned in the preamble of the instant specification.

Figure 2:
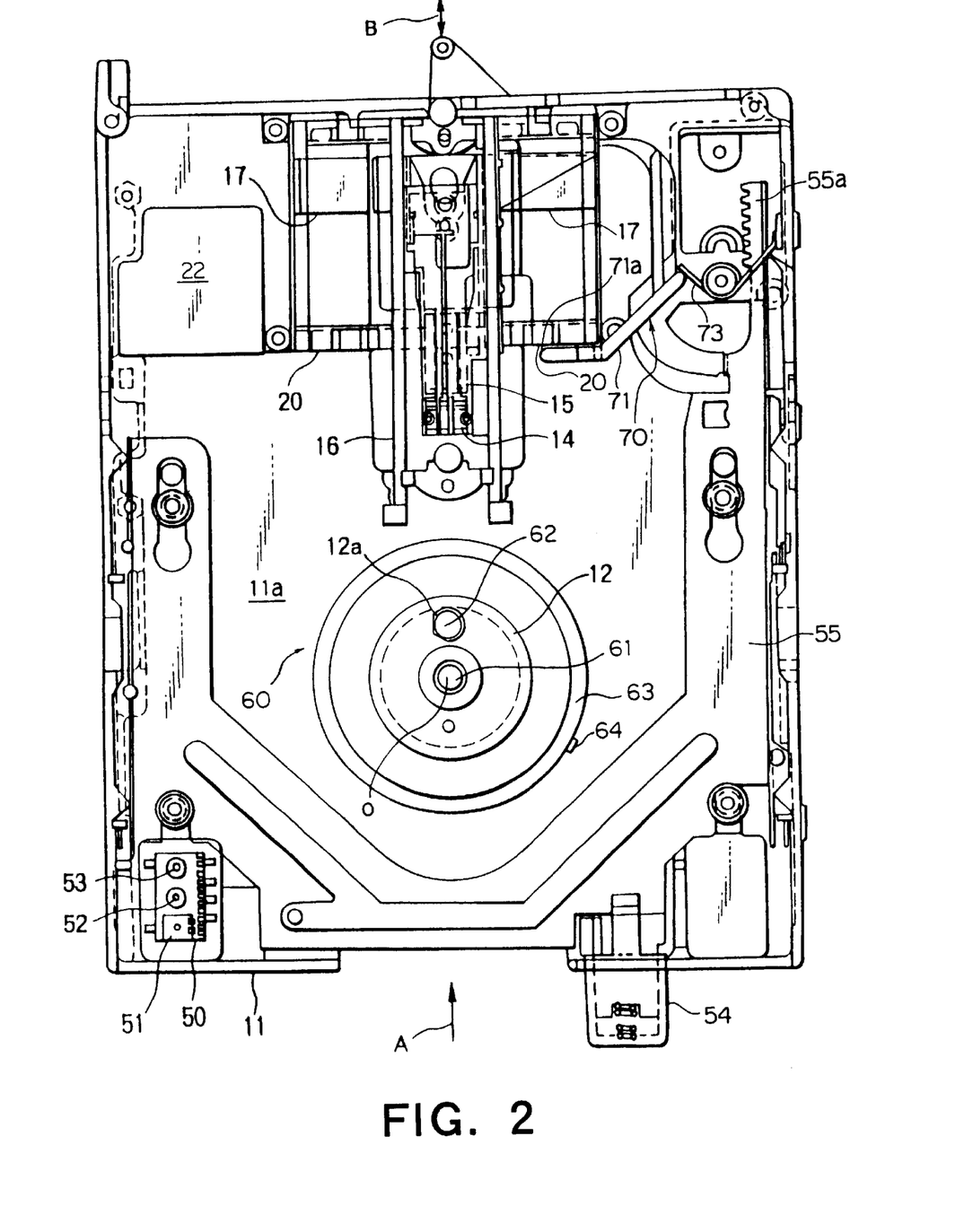
FIG. 2 is a plan view of a high-density type flexible disk drive (FDD) to which a defect management method according to this invention is applicable.

Referring to FIG. 2, description will proceed to a high-density type flexible disk drive (FDD) to which a defect management method according to this invention is applicable. The illustrated high-density type FDD is a high-density and low-density compatible type FDD which enable to carry out recording and reproducing of data for magnetic recording media of both a large-capacity and a small-capacity flexible disks (FDs) which will later be described. The flexible disk is loaded into the high-density type FDD from an insertion direction indicated by an arrow A in FIG. 2. FIG. 2 shows a state where the flexible disk is loaded into the high-density type FDD. The flexible disk has a disk center axis (not shown).

The high-density type FDD comprises a main frame 11 having a main surface 11a and a disk holder table 12 which is rotatably supported on the main surface 11a of the main frame 11. The disk holder table 12 has a table center axis O which acts as the axis of the rotation. The loaded flexible disk is held on the disk holder table 12 so that the table center axis O coincides with the disk center axis. The disk holder table 12 is rotatably driven by a spindle motor (SPM) 60. The spindle motor 60 is mounted on the main frame 11 with the spindle motor 60 put into a state embedded in a concave portion (not shown) of the main frame 11, thereby the magnetic disk medium of the flexible disk rotates at a desired rotation speed in the manner which will become clear. In addition, the main frame 11 has a back surface (not shown) on which a printed-circuit board 22 is mounted. A number of electronic parts (not shown) are mounted on the printed-circuit board 22.

The high-density type FDD comprises a pair of magnetic heads (not shown) for reading/writing data from/to the magnetic disk medium 41 in the large-capacity FD 40. The magnetic heads are supported via gimbals 14 with a carriage 15. A combination of the gimbals 14 and the carriage 15 is called the carriage assembly. The carriage 15 is disposed over the main surface 11a of the main frame 11 with a space left therebetween. The carriage 15 supports the magnetic heads movably along a predetermined radial direction (i.e. a direction indicated by an arrow B in FIG. 2) with respect to the large-capacity FD 40.

The carriage 15 is supported and guided at both lower sides thereof by a pair of guide bars 16 which extend to directions in parallel with the predetermined radial direction B. The carriage assembly in driven in the predetermined radial direction B by a voice coil motor (VCM) which will presently be described. As shown in FIG. 2, the carriage assembly is provided with a pair of voice coils 17 at opposite rear sides thereof. The voice coils 17 act as components of the voice coil motor.

Now, description will be made as regards the voice coil motor (VCM). The voice coil motor comprises the pair of voice coils 17 located at the opposite rear sides of the carriage assembly and wounded around drive axes parallel to the predetermined radial direction B, and a pair of magnetic circuits 20 for producing magnetic fields intersecting electric currents flowing through the voice coils 17. In the voice coil motor of the above-mentioned structure, when the electric current is made to flow through each of the voice coils 17 in a direction intersecting the magnetic field produced by the magnetic circuits 20, a drive force is generated in an extending direction of each drive axis as a result of interaction between the electric current and the magnetic field. The drive force causes the voice coil motor to make the carriage assembly move in the predetermined radial direction B.

As shown in FIG. 2, the spindle motor 60 is mounted on the main surface 11a with the spindle motor embedded in the concave portion of the main frame 11. The spindle motor 60 comprises a spindle shaft 61 which is rotatably supported with respect to the main frame 11 via a ball bearing (not shown) substantially perpendicular to the main surface 11a of the main frame 11. The spindle shaft 61 serves as the axis O of the rotation for the magnetic disk medium of the flexible disk loaded in the high-density type FDD. The disk holder table 12 is fixed to the spindle shaft 61 at an upper portion thereof. The disk holder table 12 has a main surface which extends to a direction perpendicular to a longitudinal direction (a direction of the axis O of the rotation) of the spindle shaft 61.

That is, the disk holder table 12 is rotatably supported on the main surface 11a of the main frame 11 and holds the flexible disk loaded in the high-density type FDD so that the table center axis O (the axis of the rotation) coincides with the disk center axis of the flexible disk.

Figure 3A:
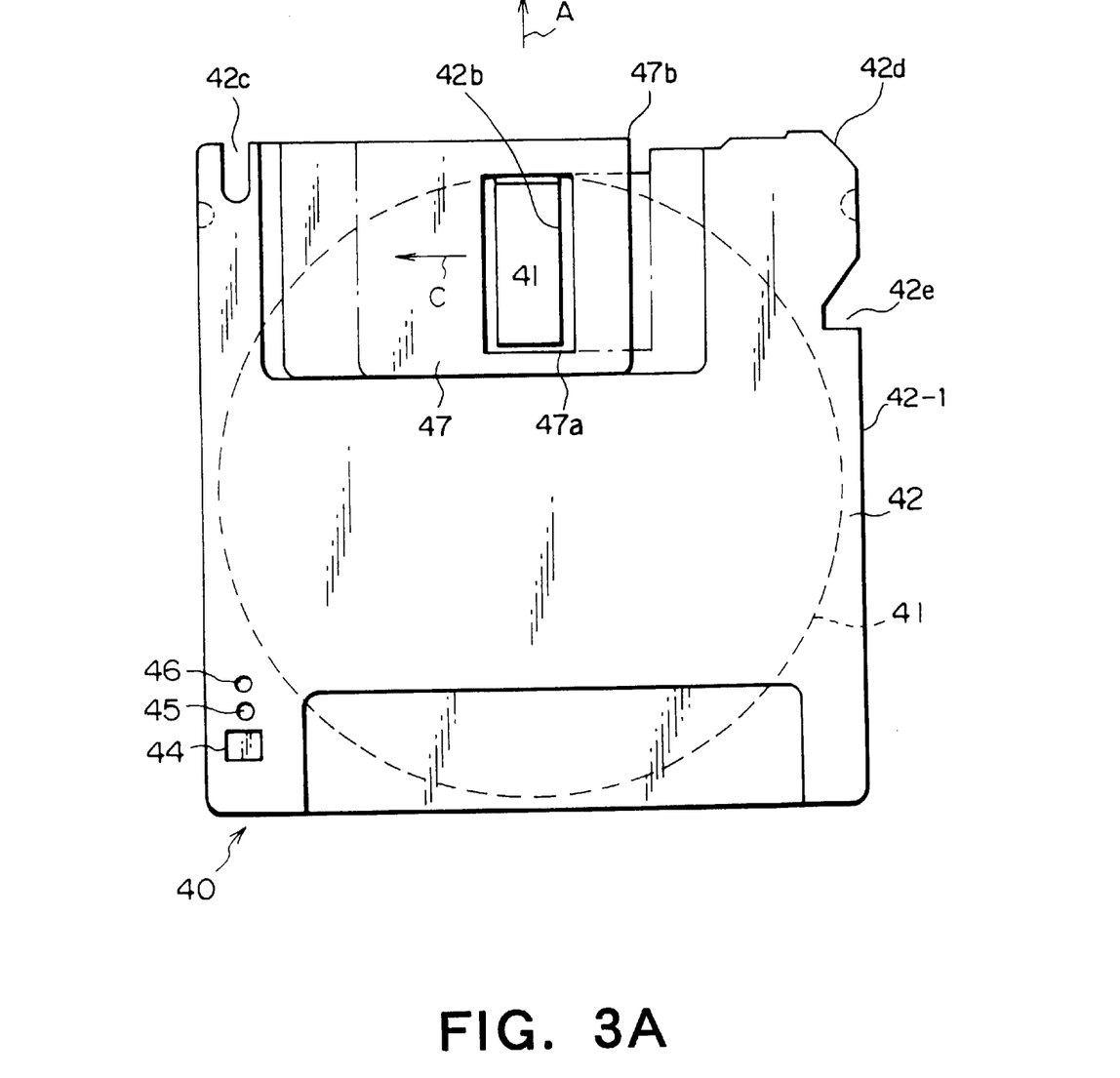
FIGS. 3A and 3B collectively show a large-capacity flexible disk (FD) loaded in the high-density type FDD illustrated in FIG. 2.
Figure 3B:
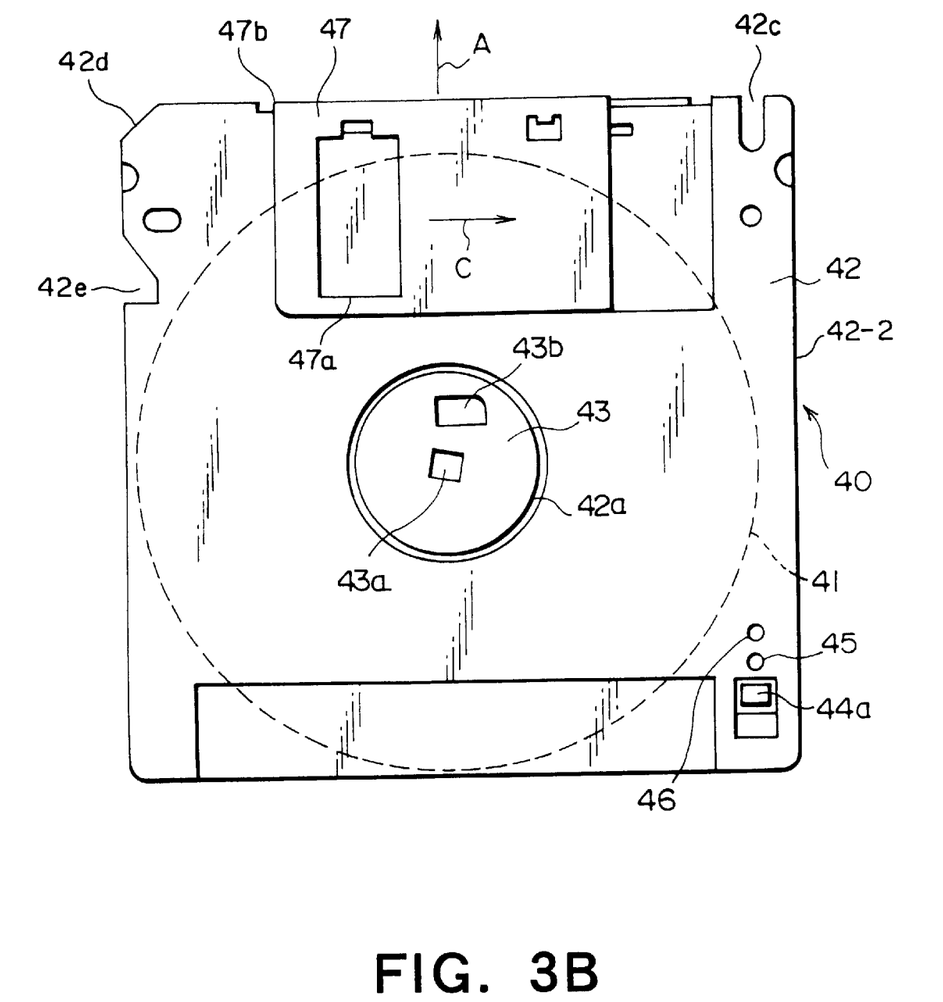

Turning to FIGS. 3A and 3B, description will proceed to the large-capacity FD depicted at 40. FIG. 3A is a plane view of the large-capacity FD 40 as seen from an upper surface side while FIG. 3B is a bottom view of the large-capacity FD 40 as seen from a lower surface side. The illustrated large-capacity FD 40 is a 3.5-inch type and comprises a magnetic disk medium 41, a jacket 42 for receiving or covering the magnetic disk medium 41. The jacket 42 consists of an upper shell 42-1 (FIG. 3A) having the upper surface and a lower shell 42-2 (FIG. 3B) having the lower surface.

As shown in FIG. 3B, in the lower shell 42-2, a jacket or shell circular opening 42a is formed at a center portion of the large-capacity FD 40. In the jacket circular aperture 42a is freely received a supporting hub 43 for supporting the magnetic recording medium 41. The supporting hub 43 has a hub center hole 43a at a center portion thereof and a chucking hole (a disk driving oval hole) 43b at a position eccentric with the center position thereof. The hub center hole 43a has substantially a rectangular shape and receives the spindle shaft 61 (FIG. 2) therein in the manner which later be described. The chucking hole 43b freely receives a chucking pin or a drive roller 62 (FIG. 2) therein in the manner which will also later be described.

Turning back to FIG. 2 again in addition to FIG. 3A, the disk holder table 12 has a table diameter which is greater than that of the supporting hub 43 and which is smaller than that of the jacket circular opening 42a of the jacket 42.

The disk holder table 12 has a table driving oval hole 12a at a position corresponding to the chucking hole (the disk driving oval hole) 43b. Through the table driving oval hole 12a, the chucking pin (the drive roller) 62 is freely received in the chucking hole 43b of the flexible disk 40 in the manner which will later become clear. The disk holder table 12 is mounted on a magnetic case 63 at a bottom surface thereof. The chucking pin 62 is rotatably and movably mounted in the magnetic case 63 with the chucking pin 62 urged upwardly. Accordingly, the chucking pin 62 moves downwardly or sinks in the disk holder table 12 if any load is applied to the chucking pin 62 downwards. The magnetic case 63 comprises a circumferential wall (not shown) having an outer surface at a predetermined position of which an index detection magnet 64 of rectangular parallelepiped shape is fixed.

Referring to FIGS. 3A and 3B again, a write protection hole 44 is bored in the jacket 42 of the large-capacity FD 40 at a corner portion in rear and right-hand side with respect to the insertion direction A of FIG. 3B as view from the lower shell 42-2. In other words, the write protection hole 44 is bored in the jacket 42 of the large-capacity FD 40 at the corner portion in rear and left-hand side in the insertion direction A of FIG. 3A as viewed from the upper shell 42-1. FIG. 3B shows a state where the write protection hole 44 is shut by a write protection tab 44a. The write protection tab 44a manually enables to slide along a direction in parallel with the insertion direction A. It is possible to carry out opening and closing of the write protection hole 44 by operating the write protection tab 44a manually. When the write protection hole 44 is closed by the write protection tab 44a, the large-capacity FD 40 is put into a write enable state. When the write protection hole 44 is opened by the write protection tab 44a, the large-capacity FD 40 is put into a write disable state.

The illustrated large-capacity FD 40 shows a case where there is two types of storage capacity of, for example, 128 Mbytes and 256 Mbytes. In the vicinity of the write protection hole 44, a large-capacity identifier hole 45 is bored in the jacket 42 of the large-capacity FD 40. The large-capacity identifier hole 45 is for identifying the large-capacity FD 40 in distinction from the small-capacity FD. In addition, a type identifier hole 46 is selectively bored in the jacket 42 of the large-capacity FD 40 near the write protection hole 44 together with the large-capacity identifier 45. The type identifier hole 46 is for identifying a type of the large-capacity FD 40. It is possible to identify the type of the large-capacity ED 40 according to the presence or absence of the type identifier hole 46. It is assumed that the large-capacity FD 40 having the storage capacity of 128 Mbytes is referred to as a first type of the large-capacity FD while the large-capacity FD 40 having the storage capacity of 256 Mbytes is referred to as a second type of the large-capacity FD. In the example being illustrated, the type identifier hole 46 is not bored in the jacket 42 of the first type of the large-capacity FD while the type identifier hole 46 is bored in the jacket 42 of the second type of the large-capacity FD.

Although illustration is omitted, as is well known in the art, the large-capacity identifier hole 45 and the type identifier hole 46 are not bored in the jacket of the small-capacity FD.

Turning back to FIG. 2 in addition to FIGS. 3A and 3B, on the printed-circuit board 22 mounted on the back surface of the main frame 11, the high-density type FDD further comprises a switch unit 50 at a corner position in rear and left-hand side with respect to the insertion direction A. The switch unit 50 comprises a plurality of push switches which will presently be described. The switch unit 50 is for detecting the presence or absence of the write protection hole 44, the large-capacity identifier hole 45, and the type identifier hole 46.

More specifically, the switch unit 50 comprises, as the push switches, a write control switch 51, a large-capacity detecting switch 52, and a type detecting switch 53. The write control switch 51 is a push switch for detecting the opening or closing state of the write protection hole 44. The write control switch 51 is disposed at a position corresponding to the write protection hole 44 when the large-capacity FD 44 is loaded in the high-density type FDD. The large-capacity detecting switch 52 is a push switch for detecting whether the loaded flexible disk is the large-capacity FD 40 or the small-capacity FD. The large-capacity detecting switch 52 is disposed at a position corresponding to the large-capacity identifier hole 45 when the large-capacity FD 40 is loaded in the high-density type FDD. The type detecting switch 53 is a push switch for detecting the presence or absence of the type identifier hole 45. The type detecting switch 53 is disposed at a position corresponding to the type identifier hole 46 when the large-capacity FD is loaded in the high-density type FDD.

Although illustration is omitted, a stator (not shown) of the spindle motor 60 comprises a frequency generation pattern (which is abbreviated an FG pattern hereinafter) for detecting the rotation speed thereof. The FG pattern generates an FG signal having pulses which in number to sixty during one rotation of the spindle motor 60. As is well known in the art, 300 rpm is equivalent to 5 Hz/rev while 3,600 rpm is equivalent to 60 Hz/rev. As a result, the FG pattern generates the FG signal having a frequency of 300 Hz if the magnetic recording medium 11 of the small-capacity FD 10 rotates at its prescribed rotation speed of 300 rpm by the spindle motor 60. Likewise, the FG pattern generates the FG signal having a frequency of 3,600 Hz if the magnetic recording medium 41 of the large-capacity FD 40 rotates at its prescribed rotation speed of 3,600 rpm by the spindle motor 60.

As shown in FIGS. 3A and 3B, the large-capacity FD 40 further comprises a shutter 47 at a front side thereof. The shutter 47 is slidable in a direction depicted at C in FIGS. 3A and 3B. The shutter 47 is provided with a shutter window 47a. The shutter 47 is urged by a shutter spring in a direction reverse to the direction C. When the shutter 47 makes sliding movement in to the direction C, the shutter window 47a of the shutter 47 is faced to a head window 42b formed in the jacket 42. At this time, it is possible to access the magnetic disk medium 41 by upper and lower magnetic heads (not shown) through the head window 42b.

Turning back to FIG. 2, the high-density type FDD includes a shutter drive mechanism for opening and closing the shutter 47 of the large-capacity FD 40, an ejector mechanism for ejecting the large-capacity FD 40, and a carriage locking mechanism for locking a direct-acting type carriage mechanism (which will later be described) after rejection of the large-capacity FD 40.

The high-density type FDD further comprises a lever unit 70. The lever unit 70 comprises an eject lever 71 and a lock lever 72. The eject lever 71 serves both as a component of the shutter drive mechanism for opening and closing the shutter 47 and as a component of the ejector mechanism for ejecting the large-capacity FD 40 from the high-density type FDD. The lock lever 72 is located in the vicinity of the direct-acting type carriage mechanism and serves to lock the direct-acting type carriage mechanism upon ejection of the large-capacity FD 40.

The ejector mechanism comprises an eject bottom 54 projecting into an outer surface of a front bezel (not shown) of the high-density type FDD, an eject plate 55 for positioning the large-capacity FD 40 loaded through an insertion slot (not shown) of the front bezel so that one surface of the large-capacity FD 40 is faced to the eject plate 55, and a pair of eject springs (not shown) having one end engaged with the eject plate 55 and the other end engaged with a disk holder unit (not shown). The eject plate 55 has a rack 55a at its top end in a depth direction. The rack 55a is engaged with a pinion (not shown) rotatably supported on the main surface 11a of the main frame 11. The lever unit 70 is urged by a spring mechanism 73 in a counterclockwise direction.

It is assumed that the large-capacity FD 40 is loaded into the disk holder unit of the high-density type FDD. Specifically, when the large-capacity FD 40 is inserted in the direction depicted at the arrow A in FIG. 2, a top end 71a of the eject lever 71 is engaged with an upper end 47b of a right side edge of the shutter 47. With the movement of the large-capacity FD 40 in the insertion direction A, the lever unit 70 is rotated in a clockwise direction. Consequently, the shutter 47 is forced by the top end 71a of the eject lever 71 to make sliding movement in the direction C.

When the large-capacity FD 40 is completely received in the disk holder unit of the high-density type FDD, the disk holder unit comes down and then the large-capacity FD 40 is locked by a disk lock mechanism (not shown) to be stably held in the disk holder unit. In this state, engagement between side arms (not shown) of the carriage assembly and the disk holder unit is released and the shutter window 47a of the shutter 47 is located directly above the head window 42b of the jacket 42, as illustrated in FIG. 3A. Accordingly, the upper and the lower magnetic heads are in contact with the magnetic disk medium 41 of the large-capacity FD 40 through the shutter window 47a of the shutter 47 and the head window 42b of the jacket 42. The shutter 47 is urged by the shutter spring to be located at a position indicated by a dash-and-dot line in FIG. 3A.

Turning back to FIGS. 3A and 3B, the jacket 42 has a first notch 42c formed on a forward side thereof in the insertion direction A. The jacket 42 further has a second notch 42e formed on a lateral side provided with a chamfered portion 42d for preventing reverse insertion (wrong insertion in a vertical direction or in the insertion direction A). The second notch 42e has a particular shape and is formed at a particular position so that the second notch 42e in reverse insertion preventing lever (not shown) of the small-density exclusive type FDD. In other words, the jacket of the small-capacity FD does not have the first and the second notches 42c and 42e.

Figure 4:
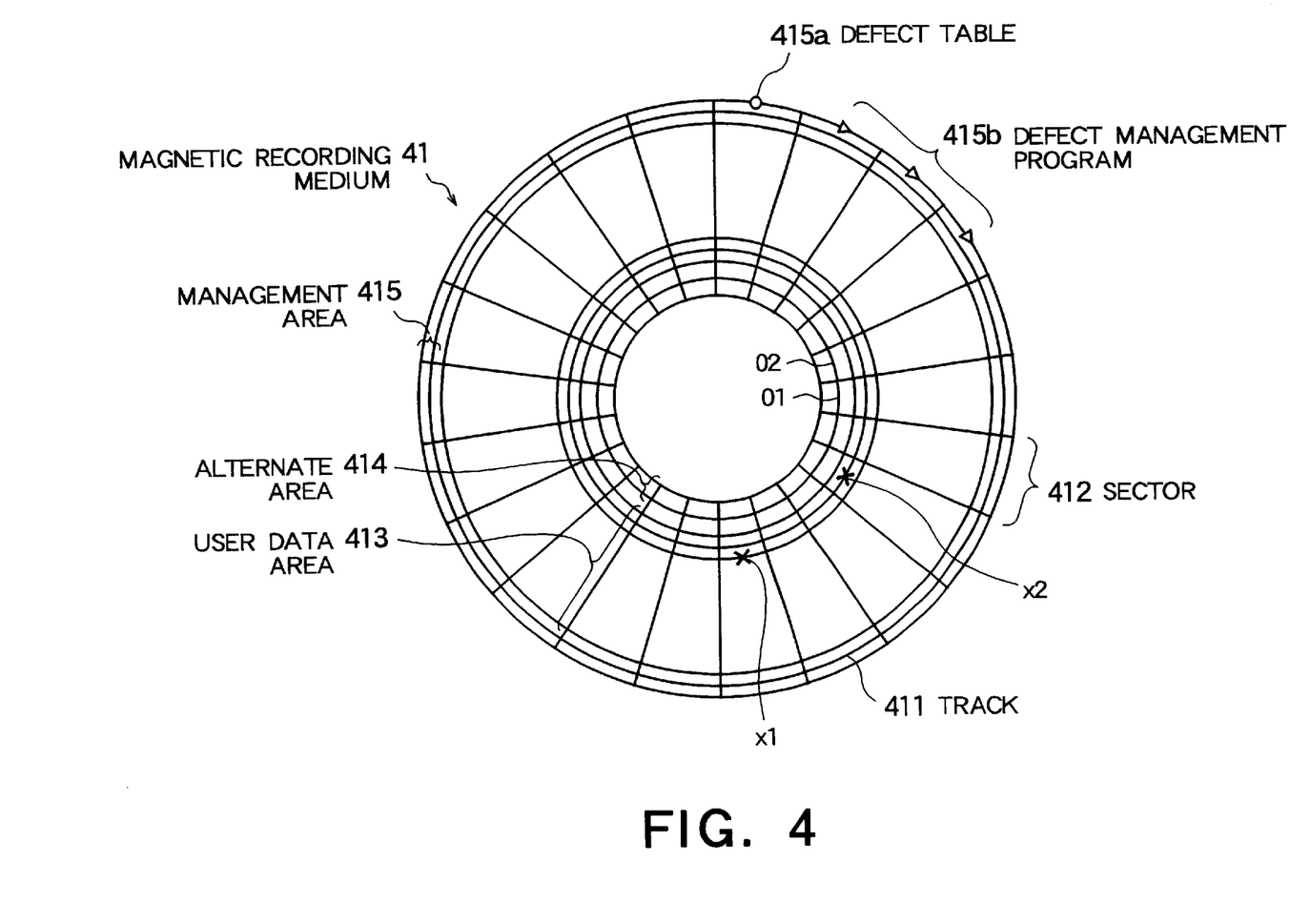
FIG. 4 is a plan view of a magnetic disk medium (a disk-shaped magnetic recording medium) for use in the large-capacity FD illustrated in FIGS. 3A and 3B.

Referring to FIG. 4, the description will proceed to the disk-shaped magnetic disk medium or the disk-shaped magnetic recording medium 41 to which the defect management method according to this invention is applicable. The magnetic recording medium 41 comprises a plurality of tracks 411 thereon which are arranged with concentric circles around a center of rotation thereof. Each track 411 is divided in a circumferential direction into a predetermined number of sectors 412 having a length equal to one another.

It will be assumed that the large-capacity FD 40 is a single-density large-capacity FD which has the storage capacity of 128 Mbytes. In this event, the single-density large-capacity FD 40 or the magnetic recording medium 41 comprises the tracks 411 which are equal in total number and in available total number to 1,866 and 1,564 each side, respectively. Each track 411 is divided into the sectors 412 which are equal in number to 80. The single-density large-capacity FD has a medium storage capacity of about 160 Mbytes in all both sides and has a format storage capacity of about 128 Mbytes in all both side. That is, a physical format for the single-density large-capacity FD 40 or the magnetic recording medium 41 arranges the tracks 411 on the magnetic recording medium 41 with concentric circles that are equal in number to 1,564 on one side and divides each track 411 into the sectors 412 which are equal in number to 80.

It will be presumed that the large-capacity FD 40 is a double-density large-capacity FD which has the storage capacity of 256 Mbytes. Inasmuch as the double-density large-capacity FD has the track density twice as large as that of the single-density large-capacity FD as described above, a physical format for the double-density large-capacity FD 40 or the magnetic recording medium 41 arranges the tracks 411 on the magnetic recording medium 41 with concentric circles that are equal in number to 3,128 on one side and divides each track 411 into the sectors 412 which are equal in number to 80. In addition, each sector 412 consists of a servo field (not shown) and a data field (not shown).

The magnetic recording medium 41 of the large-capacity FD 40 has a medium rotation speed of 3,600 rpm. In this connection, a magnetic recording medium of the small-capacity FD has a medium rotation speed of 300 or 360 rpm. That is, the medium rotation speed of the large-capacity FD 40 is twelve or ten times as large as that of the small-capacity FD.

As shown in FIG. 4, the tracks 411 on the magnetic recording medium 41 are separated into a user data area 413 available to a user, an alternate area 414 and a management area 415 other than the user data area 413. In the illustrated magnetic recording medium 41, the alternate area 414 is disposed in the magnetic recording medium 41 in a radial direction inward while the management are 415 is disposed in the management area 415 is disposed in the magnetic recording medium 41 in the radial direction outward.

The management area 415 of the magnetic recording medium 41 is provided with a predetermined sector 415a for storing a defect map or a defect table (which will later become clear) and with specific sectors for storing a defect management program which will later be described.

Figure 5:
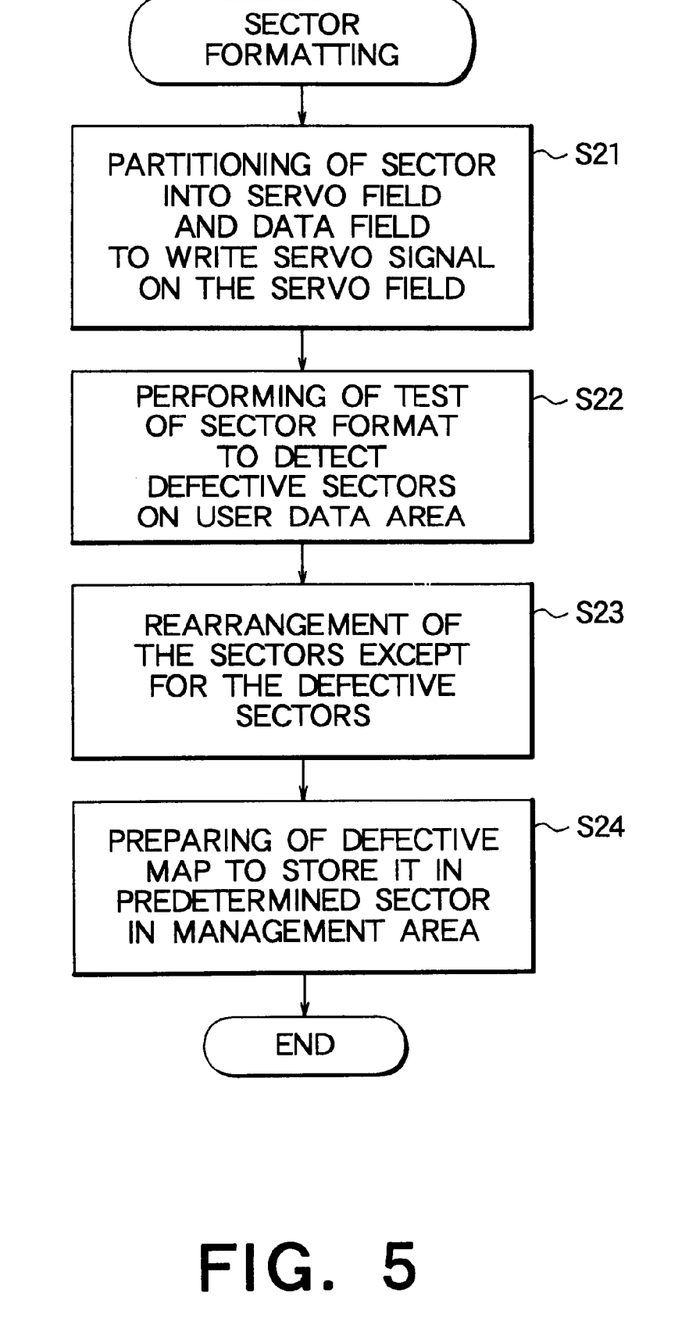
FIG. 5 is a flow chart for use in describing a sector formatting processing for the disk-shaped magnetic recording medium illustrated in FIG. 4.

Referring to FIG. 5 in addition to FIG. 4, description will proceed to a sector formatting method for the magnetic recording medium 41.

The sector formatting is performed by using a servo writer (not shown) and a media formatter (not shown). The servo writer partitions first each sector 412 into the servo field and the data field to write a serve signal in the servo field (step S21). Thereafter, the media formatter carries out test of the sector format and preparation of the defect map (the defect table).

Specifically, the media formatter first performs test of the sector format to detect the detective sectors on the user data area 413 (step S22). In the example being illustrated, it is assumed that there is defective sectors depicted at x1, x2, . . . , and so on as shown in FIG. 4. Subsequently, the media formatter carries out rearrangement of the sectors except for the defective sectors (step S23). In the example being illustrated, the media formatter carries out rearrangement of the sectors 412 so that the defective sectors x1 and x2 are alternated by alternate sectors depicted as O1 and O2 in the alternate area 414, respectively. Thereafter, the media formatter prepares the above-mentioned defect map (defect table) to store the defect map (defect table) in the predetermined sector 415a of the management area 415 (step S24). The defect map (defect table) is a table for entering information indicating where the defective sectors x1, x2, . . . on the user data area 413 are arranged to which alternate sectors O1, O2, . . . in the alternate area 414. If such a sector-formatted flexible disk 40 has the storage capacity which is less than a predetermined specification storage capacity due to the presence of a lot of defective sectors, the sector-formatted flexible disk 40 is discarded because the sector-formatted flexible disk 40 cannot be used any longer.

The large-capacity FD 40 having such a formatted magnetic recording medium 41 is put on the market to be bought by a user. In addition, the user loads the large-capacity FD 40 in the high-density type FDD such as a high-density and low-density compatible type FDD illustrated in FIG. 2 to enable the high-density type FDD to carry out recording and reproducing (writing and reading) of data on the magnetic recording medium 41 of the large-capacity FD 40.

Now, the present invention relates to a defect management method on carrying out a read command processing on such a formatted magnetic recording medium 41.

Figure 6:
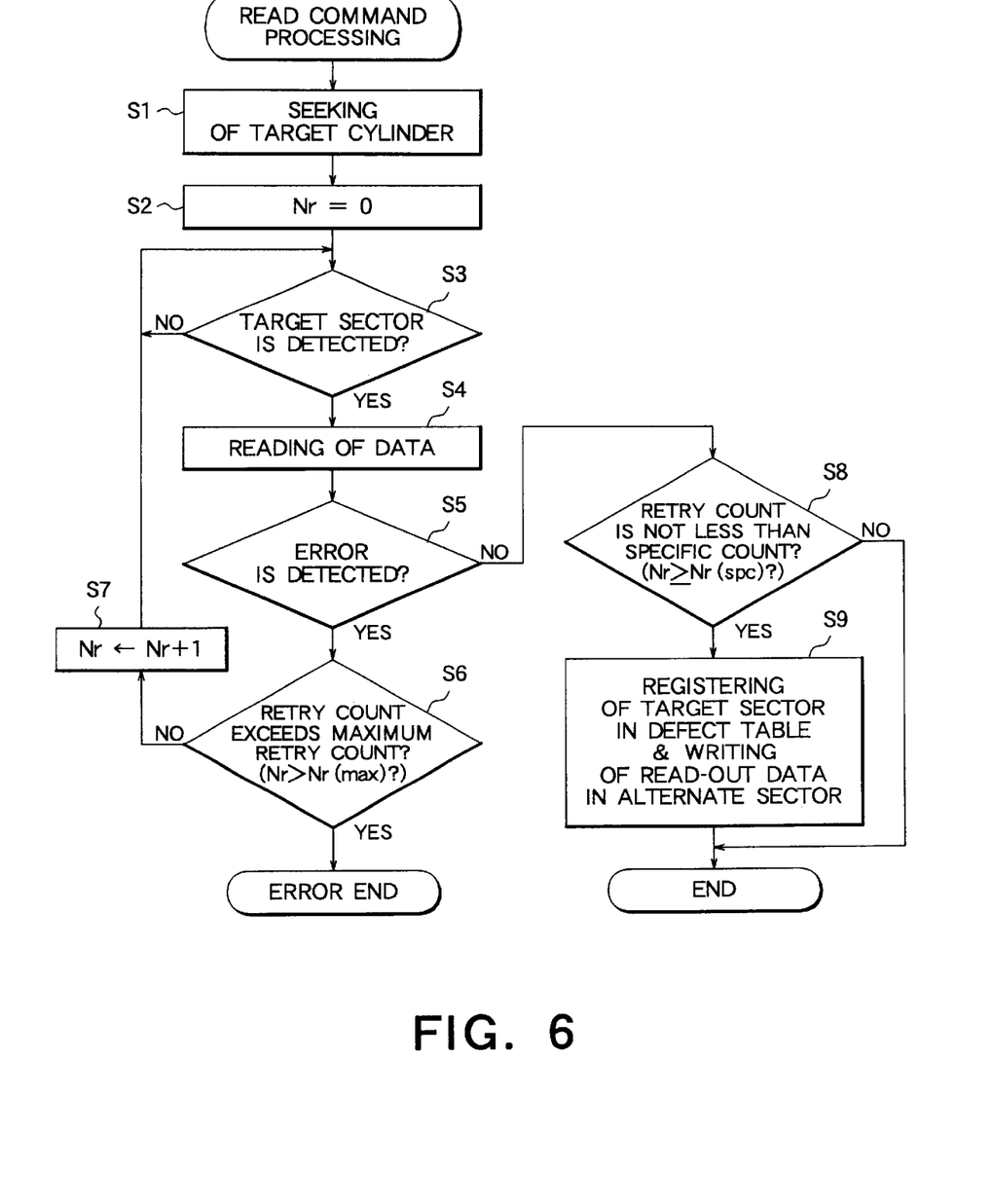
FIG. 6 is a flow chart for use in describing a defect management method for the disk-shaped magnetic recording medium according to a first embodiment of this invention.

Referring to FIG. 6, the description will proceed to a defect management method according to a first embodiment of this invention. The illustrated defect management method is similar in structure and operation to the read command processing illustrated in FIG. 1 except that the defect management method further comprises steps S8 and S9. The flexible disk drive comprises a controller or processor (not shown) for realizing the defect management method.

First, the controller seeks or locates a target cylinder using a magnetic head of the flexible disk drive (step S1). The step S1 is followed by a step S2 at which the controller initializes a retry count Nr to zero, namely, Nr=0. The step S2 proceeds to a step S3 at which the controller determines whether or not a target sector is detected on the target cylinder using the magnetic head. When the target sector is detected, the step S3 is succeeded by a step S4 at which the controller reads data out of the target sector using the magnetic head. The step S4 is followed by a step S5 at which the controller determines whether or not an error is detected in the read-out data.

On the other hand, when any error is detected read-out data, the step S5 proceeds to a step S6 at which the controller determines whether or not the retry count Nr exceeds a maximum retry count Nr(max) or (Nr>Nr(max)). The maximum retry count Nr(max) is, for example, equal to fifty. When the retry count Nr is not more than the maximum retry count Nr(max), namely, Nr≧Nr(max), the steps S6 is succeeded by a step S7 at which the controller increments the retry count Nr by one. The step S7 returns to the step S2 to repeat processing in the steps S3 through S6. When the retry count is more than the maximum retry count Nr(max), namely, Nr>Nr(max), the read command processing comes to an error end.

The above-mentioned processing is similar to that illustrated in FIG. 1. Although the conventional read command processing immediately comes to a correct end when no error is detected in the read-out data at the step S5, the defect management method according to the first embodiment of this invention carries out processing in the steps S8 and S9.

Specifically, at the step S8, the controller determines whether or not the retry count Nr is not less than a specific count Nr(spc). The specific count Nr(spc) is, for example, equal to five. However, the specific count Nr(spc) is not restricted to five and may be any count selected between one, inclusive, and the maximum retry count Nr(max), exclusive, namely, 1≧Nr(spc)<Nr(max). In addition, in a case where the maximum retry count Nr(max) is equal to fifty, desirably the specific count Nr(spc) may be a range between three and eight, both inclusive.

When the retry count Nr is less than the specific count Nr(spc), namely, Nr<Nr(spc), the controller ends the read command processing because the controller determines that it is not feared that the target sector becomes the defective sector. On the contrary, if the retry count Nr is not less than the specific count Nr(spc), the controller determines that it is feared that the target sector becomes the defective sector in the near future and the step S8 proceeds to the step S9. At the step S9, the controller registers or stores the target sector in the defect table (the predetermined sector 415a in FIG. 4) and writes the read-out data in an alternate sector in the alternate area 414.

By carrying out the above-mentioned defect management, it is possible to previously protect data stored in the data sector before the data sector in the user data area 413 becomes the defective sector progressively due to defect or the like. Accordingly, inasmuch as it is possible to decrease the retry count Nr on reading of data, it is possible to shorten a data readout time.

Figure 7:
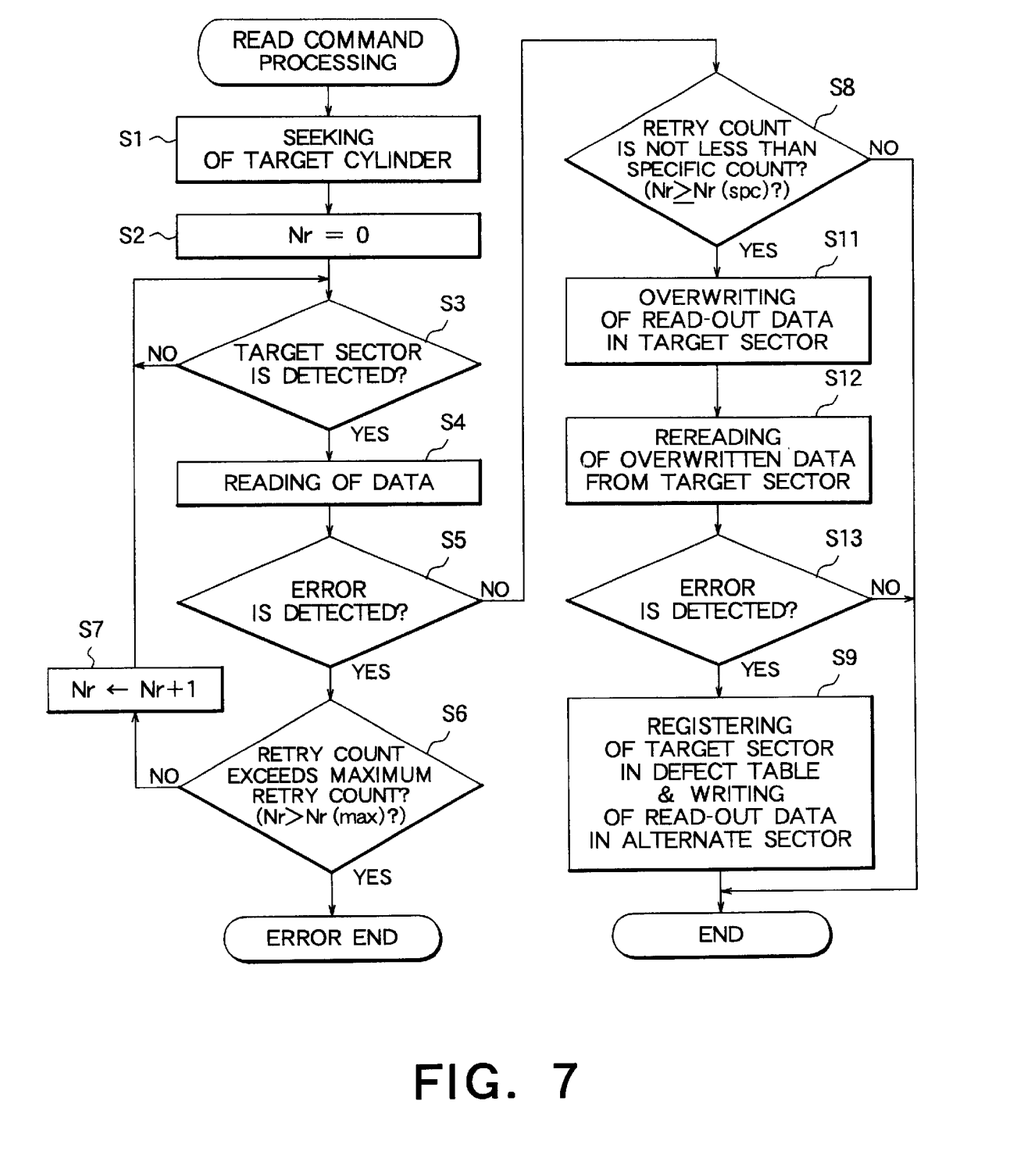
FIG. 7 is a flow chart for use in describing a defect management method for the disk-shaped magnetic recording medium according to a second embodiment of this invention.

Referring to FIG. 7, the description will proceed to a defect management method according to a second embodiment of this invention. The illustrated defect management method is similar in structure and operation to that illustrated in FIG. 6 except that steps S11 through S13 are inserted between the steps S8 and S9. Accordingly, the description will be made about only points different from FIG. 6 in order to avoid repetition of the description.

Although the step S8 directly proceeds to the step S9 in the first embodiment illustrated in FIG. 6 when the retry count Nr is not less than the specific count Nr(spc), namely, Nr≧Nr(spc), the step S8 proceeds to the step S11 in the second embodiment.

At the step S11, the controller overwrites or rewrites the read-out data in the target sector using the magnetic head. The step S11 is succeeded by the step S12 at which the controller rereads the overwritten data from the target sector using the magnetic head. The step S12 is followed by the step S13 at which the controller determines whether or not an error is detected in the read-out data. When no error is detected in the read-out data, the controller ends the read command processing. On the other hand, when any error is detected in the read-out data, the step S13 proceeds to the step S9.

It is clear that the second embodiment has similar merits in the first embodiment. In the second embodiment, data is written in the alternate sector only when collect data is read out of the target sector although the data is overwritten in the target sector. As a result, it is possible to carry out protection of data stored in the target sector only when it is feared that the target sector certainly becomes the defective sector in the near future.

While this invention has thus far been described in conjunction with preferred embodiments thereof, it will now be readily possible for those skilled in the art to put this invention into various other manners. For example, it is clear that this invention may be applicable to other magnetic recording media such as a hard disk (HD) as well as the large capacity FD.

In addition, although the above-mentioned embodiments are made about a case of carrying out normal reading and writing of data, the defect management method may be carried out on the sector formatting illustrated in FIG. 5. That is, the defect management illustrated in FIG. 6 or FIG. 7 may be carried out after the step S24 in FIG. 5. Inasmuch as the large-capacity FD 40 having such a formatted magnetic recording medium 41 has an extremely small retry count on reading operation of data, it is possible to shorten a data readout time.

Furthermore, a program realizing the defect management method illustrated in FIG. 6 or FIG. 7 may be recorded in a recording medium (not shown) such as the magnetic recording medium 41 illustrated in 4. Herein, the "recording medium" means a recording medium for recording the program which enables a computer to read. For example, the recording medium may be a compact disc read-only memory (CD-ROM), a magnetic disk such as a floppy or flexible disk, a semiconductor memory, or the like. In addition, the recording medium may be that distributed via a communication medium. At any rate, it is possible for the computer to carry out the predetermined processing by installing the program from the recording medium in the computer.

What is claimed is:

1. A method of carrying out defect management on reading data from a disk-shaped magnetic recording medium to be accessed, the magnetic recording medium comprising a plurality of tracks thereon which are arranged with concentric circles, each track being divided in a circumferential direction into a predetermined number of sectors having a length equal to one another, said plurality of tracks being separated into a user data area available to a user, an alternate area, and a management area, said method comprising the steps of:

retrying reading operation of data up to a maximum retry count when an error is detected on reading of data for a target sector in the user data area; and registering the target sector in a defect table in the management area and writing read-out data in an alternate sector in the alternate area in a case where a retry count is not less than a specific count when retry results in a success.

2. A method as claimed in claim 1, wherein the maximum retry count is equal to fifty and the specific count being a range between three and eight, both inclusive.

3. A method as claimed in claim 2, wherein the specific count is equal to five.

4. A method of carrying out defect management on reading data from a disk-shaped magnetic recording medium to be accessed, the magnetic recording medium comprising a plurality of tracks thereon which are arranged with concentric circles, each track being divided in a circumferential direction into a predetermined number of sectors having a length equal to one another, said plurality of tracks being separated into a user data area available to a user, an alternate area, and a management area, said method comprising the steps of:

retrying reading operation of data up to a maximum retry count when an error is detected on reading of data for a target sector in the user data area;

overwriting read-out data in the target sector in a case where a retry count is not less than a specific count when retry results in a success; and     registering the target sector in a defect table in the management area and writing read-out data in an alternate sector in the alternate area in a case where an error is detected when overwritten data is reread from the target sector.

5. A method as claimed in claim 4, wherein the maximum retry count is equal to fifty and the specific count being a range between three and eight, both inclusive.

6. A method as claimed in claim 5, wherein the specific count is equal to five.

7. A recording medium for recording a program to make a computer execute defect management on reading data from a disk-shaped magnetic recording medium to be accessed, the magnetic recording medium comprising a plurality of tracks thereon which are arranged with concentric circles, each track being divided in a circumferential direction into a predetermined number of sectors having a length equal to one another, said plurality of tracks being separated into a user data area available to a user, an alternate area, and a management area, said recording medium recording the program to make said computer execute:

processing of retrying reading operation of data up to a maximum retry count when an error is detected on reading of data for a target sector in the user data area; and     processing of registering the target sector in a defect table in the management area and of writing read-out data in an alternate sector in the alternate area in a case where a retry count is not less than a specific count when retry results in a success.

8. A recording medium as claimed in claim 7, wherein the maximum retry count is equal to fifty and the specific count being a range between three and eight, both inclusive.

9. A recording medium as claimed in claim 8, wherein the specific count is equal to five.

10. A recording medium for recording a program to make a computer execute defect management on reading data from a disk-shaped magnetic recording medium to be accessed, the magnetic recording medium comprising a plurality of tracks thereon which are arranged with concentric circles, each track being divided in a circumferential direction into a predetermined number of sectors having a length equal to one another, said plurality of tracks being separated into a user data area available to a user, an alternate area, and a management area, said recording medium recording the program to make said computer execute:

processing of retrying reading operation of data up to a maximum retry count when an error is detected on reading of data for a target sector in the user data area;

processing of overwriting read-out data in the target sector in a case where a retry count is not less than a specific count when retry results in a success; and     processing of registering the target sector in a defect table in the management area and of writing read-out data in an alternate sector in the alternate area in a case where an error is detected when overwritten data is reread from the target sector.

11. A recording medium as claimed in claim 10, wherein the maximum retry count is equal to fifty and the specific count being a range between three and eight, both inclusive.

12. A recording medium as claimed in claim 11, wherein the specific count is equal to five.

* * * * *